United States Patent
Hosokawa

(10) Patent No.: US 9,343,994 B2
(45) Date of Patent: May 17, 2016

(54) POWER CONVERSION APPARATUS HAVING TWO SECONDARY WINDING GROUPS

(75) Inventor: Yasuhiko Hosokawa, Chuo-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 14/368,673

(22) PCT Filed: Jan. 18, 2012

(86) PCT No.: PCT/JP2012/050917
§ 371 (c)(1),
(2), (4) Date: Jun. 25, 2014

(87) PCT Pub. No.: WO2013/108376
PCT Pub. Date: Jul. 25, 2013

(65) Prior Publication Data
US 2014/0369096 A1    Dec. 18, 2014

(51) Int. Cl.
| H02M 7/19 | (2006.01) |
| H02M 7/04 | (2006.01) |
| H01F 30/04 | (2006.01) |
| H02M 7/49 | (2007.01) |
| H02M 7/483 | (2007.01) |

(52) U.S. Cl.
CPC .............. *H02M 7/04* (2013.01); *H01F 30/04* (2013.01); *H02M 7/49* (2013.01); *H02M 2007/4835* (2013.01)

(58) Field of Classification Search
CPC .......... H02M 7/80; H02M 7/10; H02M 7/19; H02M 7/153; H02M 7/1623; H02M 7/1626; H02M 5/458; H02M 5/4588
USPC ................... 363/34–37, 68–70, 89, 123, 129
See application file for complete search history.

(56) References Cited

U.S. PATENT DOCUMENTS

2012/0026767 A1 *    2/2012    Inoue et al. ..................... 363/89

FOREIGN PATENT DOCUMENTS

| JP | 4 271281 | 9/1992 |
| JP | 2010 233411 | 10/2010 |
| JP | 2010 239723 | 10/2010 |

OTHER PUBLICATIONS

International Search Report Issued Apr. 17, 2012 in PCT/JP12/050917 Filed Jan. 18, 2012.

* cited by examiner

*Primary Examiner* — Yemane Mehari
(74) *Attorney, Agent, or Firm* — Oblon, McClelland, Maier & Neustadt, L.L.P.

(57) ABSTRACT

A power conversion apparatus including a three-phase transformer interconnected to a three-phase power system, the three-phase transformer including a primary winding group that receives three-phase electric power of the three-phase electric power system, a first secondary winding group and a second secondary winding group that receive electric power transferred from the primary winding group, and a first converter group and a second converter group connected to the first and second secondary winding groups, respectively, the power conversion apparatus further including a DC output terminal group connected to at least one of other ends of the first to third converter arms provided in the first converter group, and connected to at least one of other ends of the fourth to sixth converter arms provided in the second converter group.

4 Claims, 8 Drawing Sheets

POWER CONVERSION APPARATUS HAVING TWO SECONDARY WINDING GROUPS

TECHNICAL FIELD

The present invention relates to a power conversion apparatus, and in particular, a power conversion apparatus interconnected to a three-phase system via a transformer.

BACKGROUND ART

The invention described in Japanese Patent Laying-Open No. 2010-233411 (PTD 1) aims to provide a power conversion apparatus configured by cascade-connecting unit converters, and interconnected to an electric power system via a transformer, the power conversion apparatus requiring no reactors, and can have a reduced volume and weight.

Specifically, the power conversion apparatus described in Japanese Patent Laying-Open No. 2010-233411 (PTD 1) is interconnected to a three-phase electric power system via a transformer, and supplies and receives effective or reactive power to and from the three-phase electric power system. In the power conversion apparatus, the secondary windings of the transformer are formed as open windings having six terminals. A first converter group formed of a circuit in which three converter arms are star-connected is connected to three terminals of the secondary windings, and a second converter group formed of a circuit in which other three converter arms are star connected is connected to three terminals of the secondary windings. The neutral point (star-connected point) of the first converter group and the neutral point (star-connected point) of the second converter group serve as output terminals of the power conversion apparatus.

CITATION LIST

Patent Document

PTD 1: Japanese Patent Laying-Open No. 2010-233411

SUMMARY OF INVENTION

Technical Problem

In the power conversion apparatus described in Japanese Patent Laying-Open No. 2010-233411 (PTD 1), one-third of a DC current component of a current ID passing through a load 123 passes through the transformer as an exciting current, and it is necessary to pass an amount of magnetic flux corresponding to this amount of DC current, and hence, it is necessary to increase the cross-sectional area of the iron core of the transformer. Consequently, the size of the transformer increases, which increases the costs of the transformer.

Accordingly, a main object of this invention is to provide a power conversion apparatus that can reduce the cross-sectional area of an iron core, and can achieve lower costs.

Solution to Problem

A power conversion apparatus according to the present invention includes a three-phase transformer interconnected to a three-phase electric power system, the three-phase transformer including a primary winding group that receives three-phase electric power of the three-phase electric power system, a first secondary winding group and a second secondary winding group that receive electric power transferred from the primary winding group, and a first converter group and a second converter group connected to the first and second secondary windings, respectively, the primary winding group having first to third primary windings, the first secondary winding group having first to third secondary windings having respective one ends star-connected at a neutral point, the second secondary winding group having fourth to sixth secondary windings having respective one ends star-connected at a neutral point, the respective neutral points of the first and second secondary winding groups being connected to each other, the first converter group having first to third converter arms having respective one ends connected to other ends of the first to third secondary windings, and the second converter group having fourth to sixth converter arms having respective one ends connected to other ends of the fourth to sixth secondary windings, the power conversion apparatus further including a DC output terminal group connected to at least one of other ends of the first to third converter arms, and connected to at least one of other ends of the fourth to sixth converter arms.

Preferably, the DC output terminal group includes a positive-side DC output terminal and a negative-side DC output terminal, the other ends of the first to third converter arms are all connected to the positive-side DC output terminal, and the other ends of the fourth to sixth converter arms are all connected to the negative-side DC output terminal.

Preferably, the power conversion apparatus supplies electric power to a load apparatus connected to the DC output terminal group, the power conversion apparatus further includes a control circuit for supplying and receiving electric power to and from the load apparatus, and the control circuit controls a voltage applied to the DC output terminal group by adjusting voltages of the first to sixth converter arms.

Moreover, preferably, each of the first to sixth converter arms has a plurality of unit converters cascade-connected.

More preferably, each of the unit converters includes a full bridge circuit or a bidirectional chopper circuit.

More preferably, each of the unit converters has a DC capacitor for smoothing an output of the full bridge circuit or the bidirectional chopper circuit.

Advantageous Effects of Invention

In the power conversion apparatus according to the invention, since a magnetic flux due to DC currents passing through the two secondary winding groups is canceled, the cross-sectional area of the iron core can be reduced, thus allowing costs to be reduced.

DESCRIPTION OF EMBODIMENTS

Figure 1:
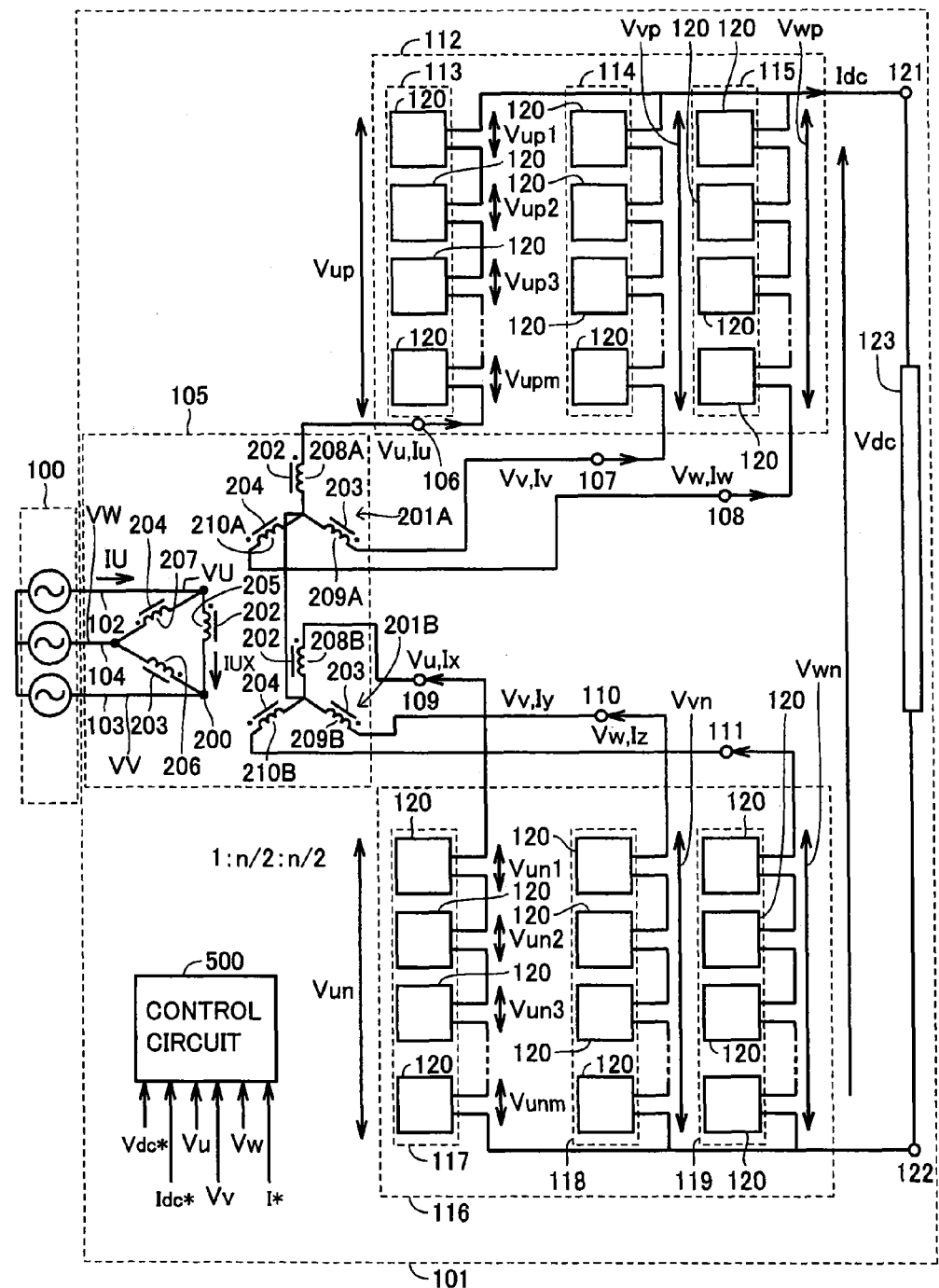
FIG. 1 is a circuit diagram illustrating the structure of a power conversion apparatus according to an embodiment of the present invention.

The present invention will hereinafter be described in detail, with reference to the drawings. In the drawings, the same or corresponding parts are indicated by the same reference signs, and description thereof will not be repeated.

[Embodiment]

The structure of a power conversion apparatus according to the present invention will be described with FIG. 1.

FIG. 1 is a circuit diagram illustrating the structure of a power conversion apparatus according to an embodiment of the present invention. With reference to FIG. 1, the power conversion apparatus includes a three-phase transformer 101. Three-phase transformer 101 includes a transformer 105, a positive-side converter group 112, a negative-side converter group 116, and a control circuit 500.

In the present embodiment, the respective phases of a three-phase power system 100 are referred to as an U-phase, a V-phase, and a W-phase. The phase voltages are denoted as VU, VV, and VW. Currents passing through the respective phases of three-phase power system 100 are referred to as system currents, and denoted as IU, IV, and IW.

Figure 2:
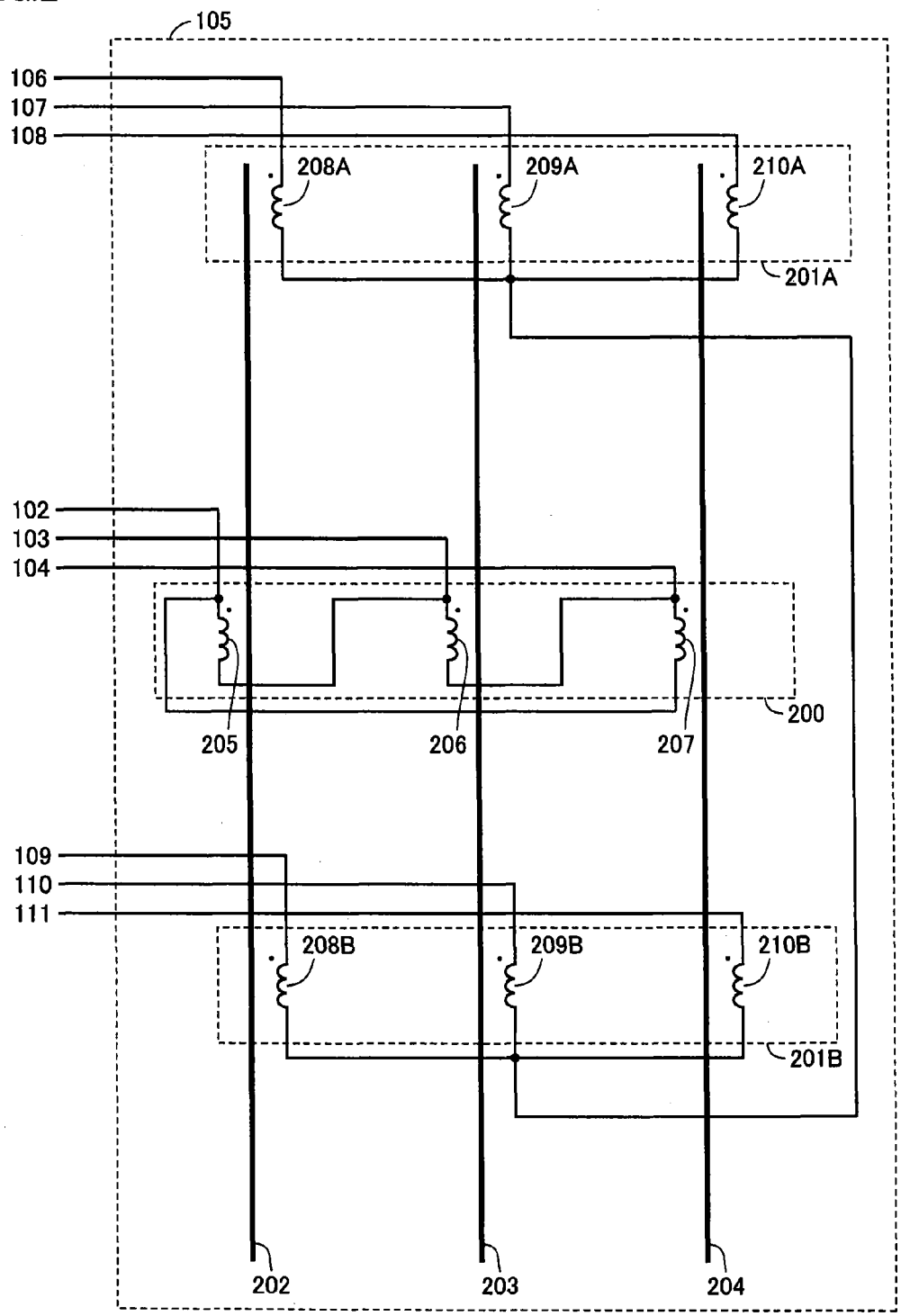
FIG. 2 is a diagram illustrating the structure of a transformer 105 in the embodiment of the present invention.

The structure of transformer 105 will be described next. FIG. 2 is a diagram illustrating the structure of transformer 105 in the embodiment of the present invention. With reference to FIGS. 1 and 2, transformer 105 includes a primary winding group 200, and two secondary winding groups 201A, 201B.

Primary winding group 200 includes an U-phase terminal 102, a V-phase terminal 103, and a W-phase terminal 104. On the other hand, secondary winding groups 201A, 201B include an u-phase positive-side terminal 106, a v-phase positive-side terminal 107, a w-phase positive-side terminal 108, an u-phase negative-side terminal 109, a v-phase negative-side terminal 110, and a w-phase negative-side terminal 111.

Here, a turns ratio of primary winding group 200, secondary winding groups 201A and 201B is 1:n/2:n/2.

FIG. 2 shows a polarity of a magnetomotive force produced in each iron core by each winding of transformer 105, and a connection of each winding. Moreover, transformer 105 has iron cores 202 to 204. Primary winding group 200 is delta-connected, and primary winding 205 between the U-phase and V-phase, primary winding 206 between the V-phase and W-phase, and primary winding 207 between the W-phase and U-phase are wound around iron cores 202, 203 and 204, respectively. The number of turns of each of primary windings 205 to 207 is substantially equal.

Secondary winding group 201A is star-connected, and includes an u-phase winding 208A, a v-phase winding 209A, and a w-phase winding 210A. The number of turns of each of windings 208A to 210A is substantially equal. Secondary winding group 201B is star-connected, and includes an u-phase winding 208B, a v-phase winding 209B, and a w-phase winding 210B. The number of turns of each of windings 208B to 210B is substantially equal. Moreover, respective neutral points of secondary winding group 201 A and secondary winding group 201 B are connected to each other. Secondary windings 208A and 208B are wound around iron core 202, secondary windings 209A and 209B are wound around iron core 203, and secondary windings 210A and 210B are wound around iron core 204.

In the present embodiment, voltage across u-phase winding 208A is denoted as Vu, voltage across v-phase winding 209A is denoted as Vv, and voltage across w-phase winding 210A is denoted as Vw.

Moreover, in the present embodiment, voltage across u-phase winding 208B is denoted as Vu, voltage across v-phase winding 209B is denoted as Vv, and voltage across w-phase winding 210B is denoted as Vw.

Load apparatus 123 is connected between a positive-side DC output terminal 121 and a negative-side DC output terminal 122 of the power conversion apparatus. Voltage applied to load apparatus 123 is denoted as Vdc, and current passing through load apparatus 123 is denoted as Idc.

The structure of positive-side converter group 112 and the structure of negative-side converter group 116 will be described next.

Positive-side converter group 112 includes an u-phase positive-side converter arm 113, a v-phase positive-side converter arm 114, and a w-phase positive-side converter arm 115. Negative-side converter group 116 includes an u-phase negative-side converter arm 117, a v-phase negative-side converter arm 118, and a w-phase negative-side converter arm 119.

Figure 4:
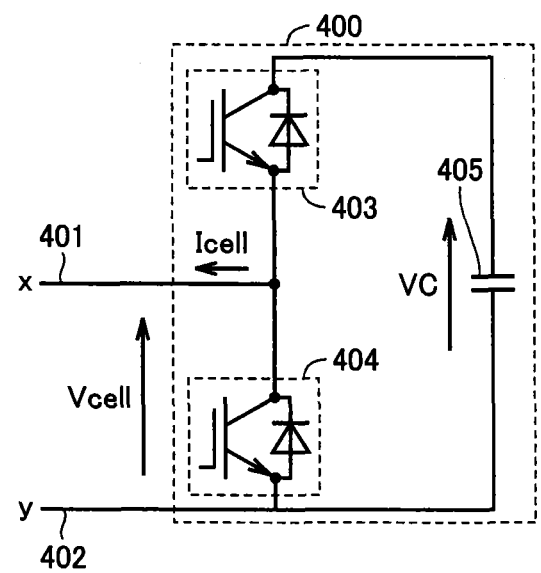
FIG. 4 is a diagram illustrating another example of the inside structure of unit converter 120.

The converter arm herein refers to a circuit in which one or more unit converters are cascade-connected. As an example of a unit converter, a bidirectional chopper circuit as illustrated in FIG. 4 that will be described below may be mentioned. Each converter arm has at least two terminals. In the present embodiment, these two terminals are referred to as a terminal a and a terminal b. Voltage from terminal b to terminal a is referred to as an arm voltage. The arm voltage is expressed as a sum of voltage differences across the unit converters included in this converter arm (hereinafter referred to as a cell voltage).

Each of converter arms 113 to 115 and 117 to 119 has terminal a (not illustrated) and terminal b (not illustrated). Each of converter arms 113 to 115 and 117 to 119 is a circuit in which one or more unit converters 120 are cascade-connected.

Terminal a of u-phase positive-side converter arm 113 is connected to positive-side DC output terminal 121, and terminal b is connected to u-phase positive-side terminal 106 of transformer 105. In the present embodiment, the arm voltage of u-phase positive-side converter arm 113 is denoted as Vup.

Terminal a of v-phase positive-side converter arm 114 is connected to positive-side DC output terminal 121, and terminal b is connected to v-phase positive-side terminal 107 of transformer 105. In the present embodiment, the arm voltage of v-phase positive-side converter arm 114 is denoted as Vvp.

Terminal a of w-phase positive-side converter arm 115 is connected to positive-side DC output terminal 121, and terminal b is connected to w-phase positive-side terminal 108 of transformer 105. In the present embodiment, the arm voltage of w-phase positive-side converter arm 115 is denoted as Vwp.

Terminal a of u-phase negative-side converter arm 117 is connected to u-phase negative-side terminal 109 of transformer 105, and terminal b is connected to negative-side DC output terminal 122. In the present embodiment, the arm voltage of u-phase negative-side converter arm 117 is denoted as Vun.

Terminal a of v-phase negative-side converter arm 118 is connected to v-phase negative-side terminal 110 of transformer 105, and terminal b is connected to negative-side DC output terminal 122. In the present embodiment, the arm voltage of v-phase negative-side converter arm 118 is denoted as Vvn.

Terminal a of v-phase negative-side converter arm 119 is connected to w-phase negative-side terminal 111 of transformer 105, and terminal b is connected to negative-side DC output terminal 122. In the present embodiment, the arm voltage of w-phase negative-side converter arm 119 is denoted as Vwn.

Moreover, in the present embodiment, current passing through u-phase positive-side converter arm 113 is denoted as a u-phase arm current Iu, current passing through v-phase positive-side converter arm 114 is denoted as a v-phase arm current Iv, and current passing through w-phase positive-side converter arm 115 is denoted as a w-phase arm current Iw.

Furthermore, current passing through u-phase negative-side converter arm 117 is denoted as an u-phase arm current Ix, current passing through v-phase negative-side converter arm 118 is denoted as a v-phase arm current Iy, and current passing through w-phase negative-side converter arm 119 is denoted as a w-phase arm current Iz.

Voltages supplied to u-phase positive-side terminal 106, v-phase positive-side terminal 107, and w-phase positive-side terminal 108 are denoted as voltage Vu, voltage Vv, and voltage Vw, respectively. Similarly, voltages supplied to u-phase negative-side terminal 109, v-phase negative-side terminal 110, and w-phase negative-side terminal 111 are denoted as voltage Vu, voltage Vv, and voltage Vw, respectively.

In the present embodiment, one ends of converter arms 113 to 115 are all connected to positive-side DC output terminal 121, and one ends of converter arms 117 to 119 are all connected to the aforementioned negative-side DC output terminal 122. The invention, however, is not limited thereto, and at least one of the one ends of converter arms 113 to 115 may be connected to positive-side DC output terminal 121, and at least one of the one ends of converter arms 117 to 119 may be connected to negative-side DC output terminal 122.

Furthermore, control circuit 500, which will be described in detail below, receives and controls DC current Idc, and voltages Vu, Vv and Vw of the respective phases, a DC voltage command value Vdc*, a DC current command value Idc*, and an AC current command value I*, to control an AC current I to a desired value.

The structure of unit converter 120 will be described next with FIGS. 3 and 4.

Figure 3:
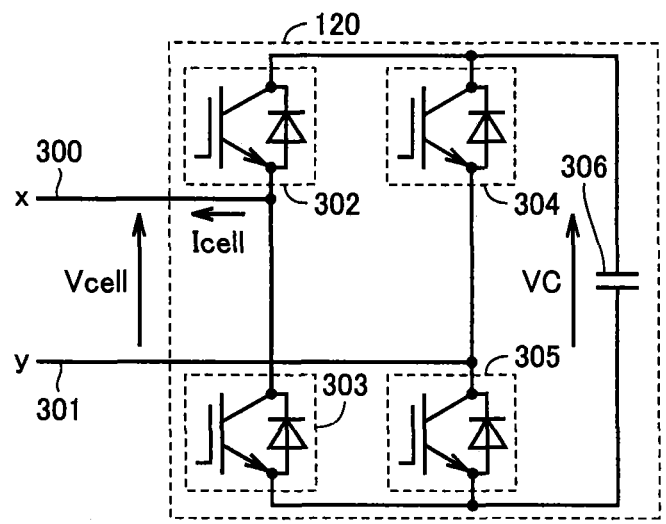
FIG. 3 is a diagram illustrating one example of an inside structure of unit converter 120.

FIG. 3 is a diagram illustrating one example of an inside structure of unit converter 120. With reference to FIG. 3, the unit converter is a full bridge circuit. Unit converter 120 is a two-terminal circuit having a terminal x 300 and a terminal y 301, and includes an x-phase positive-side switching element 302, an x-phase negative-side switching element 303, a y-phase positive-side switching element 304, a y-phase negative-side switching element 305, and an energy storage element 306. Switching elements 302 to 305 are self-turn off-type power semiconductor devices represented by IGBTs. Energy storage element 306 is a capacitor, a storage battery, or the like. In the present embodiment, voltage from terminal y to terminal x is referred to as a cell voltage Vcell of the unit converter.

Unit converter 120 can also be a bidirectional chopper circuit.

FIG. 4 is a diagram illustrating another example of the inside structure of unit converter 120. With reference to FIG. 4, the bidirectional chopper includes a positive-side switching element 403, a negative-side switching element 404, and an energy storage element 405. Switching elements 403 and 404 are self-turn off-type power semiconductor devices represented by IGBTs. Energy storage element 405 is a capacitor, a storage battery, or the like. In the present embodiment, this voltage in FIG. 4 is also denoted as cell voltage Vcell.

The fact that the arm voltage can be controlled in accordance with switching states of switching elements that form unit converter 120 will be described next.

First, the case where unit converter 120 is a full bridge circuit (FIG. 3) will be described.

X-phase switching elements 302 and 303 are each alternately turned on and off. Y-phase switching elements 304 and 305 are each alternately turned on and off.

When x-phase switching elements 302 and 303 are each turned on and off, and y-phase switching elements 304 and 305 are each turned off and on, cell voltage Vcell is substantially equal to voltage VC of energy storage element 306, without being dependent on current Icell.

When x-phase switching elements 302 and 303 are each turned on and off, and y-phase switching elements 304 and 305 are each turned off and on, cell voltage Vcell is almost zero without being dependent on current Icell.

When x-phase switching elements 302 and 303 are each turned off and on, and y-phase switching elements 304 and 305 are each turned off and on, cell voltage Vcell is almost zero without being dependent on current Icell.

When x-phase switching elements 302 and 303 are each turned off and on, and y-phase switching elements 304 and 305 are each turned on and off, cell voltage Vcell is substantially equal to a voltage having an inverted polarity of voltage VC of energy storage element 306, without being dependent on current Icell.

When x-phase switching elements 302 and 303 and y-phase switching element 304 and 305 are all in the off state, cell voltage Vcell is determined depending on the polarity of current Icell. When Icell is positive, cell voltage Vcell is substantially equal to voltage VC of energy storage element 306. When Icell is negative, cell voltage Vcell is substantially equal to a voltage having an inverted polarity of voltage VC of energy storage element 306.

The case where unit converter 120 is a bidirectional chopper (FIG. 4) will be described next.

When switching elements 403 and 404 are each turned on and off, cell voltage Vcell is substantially equal to voltage VC of energy storage element 405, without being dependent on current Icell.

When switching elements 403 and 404 are each turned off and on, cell voltage Vcell is almost zero without being dependent on current Icell.

When switching elements 403 and 404 are both in the off state, cell voltage Vcell is determined depending on the polarity of current Icell. When Icell is positive, cell voltage Vcell is substantially equal to voltage VC of energy storage element 405. When Icell is negative, cell voltage Vcell is substantially equal to zero.

How the power conversion apparatus operates when it receives effective power from three-phase power system 100 and supplies single-phase AC power or DC power to load apparatus 123 will be described hereinafter.

Figure 5:
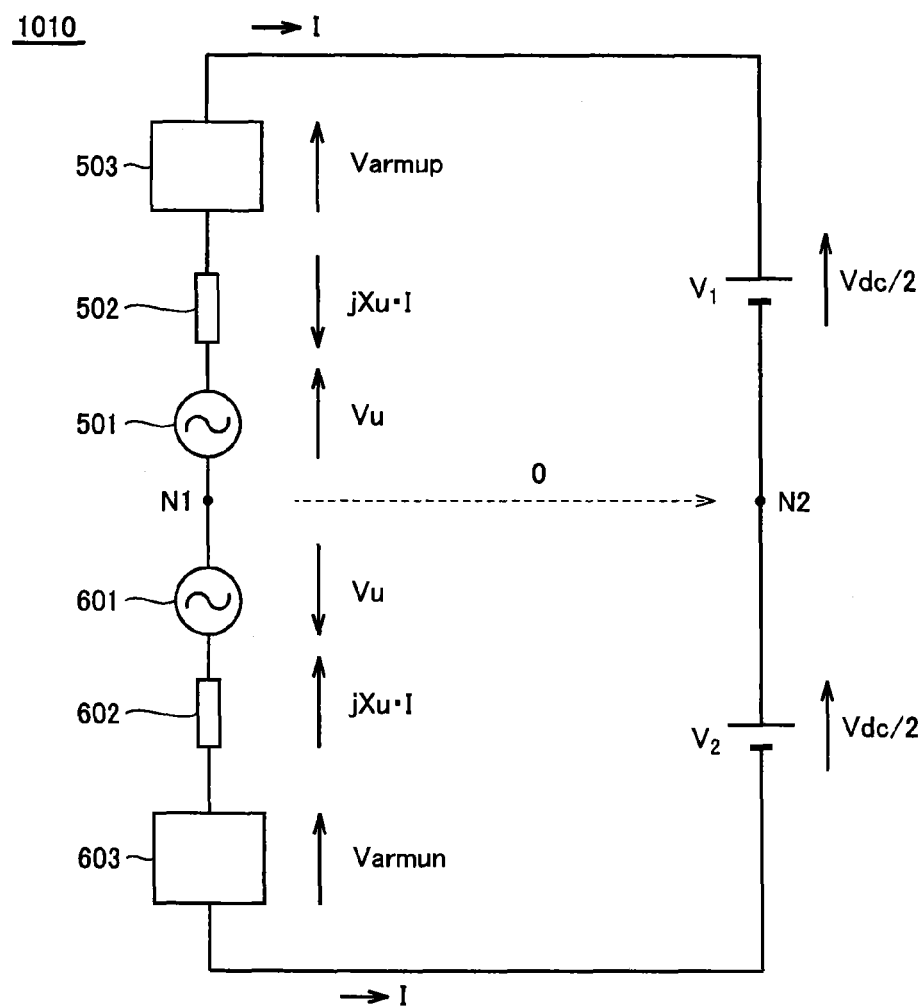
FIG. 5 is a diagram illustrating an equivalent circuit for an AC component of the power conversion apparatus.

FIG. 5 is a diagram illustrating an equivalent circuit for an AC component having a frequency of electric power system 100 of the power conversion apparatus. For easy understanding here, an equivalent circuit for an AC component in the u-phase is illustrated and described. With reference to FIG. 5, an equivalent circuit 1010 includes reactances 502 and 602 (the winding reactance of the transformer is defined as Xu), positive-side power converter 503 and negative-side power converter 603, power supplies 501 and 601 that supply voltage Vu (voltage Vu is a transformer no-load secondary voltage), and V1 and V2 that supply DC voltage Vdc/2.

Power supply V1 is connected between positive-side DC output terminal 121 and a node N2, and a voltage value of power supply V1 therebetween is Vdc/2. On the other hand, power supply V2 is connected between node N2 and negative-side DC output terminal 122, and a voltage value of power supply V2 therebetween is Vdc/2.

Between positive-side DC output terminal 121 and node N1, positive-side power converter 503, reactance 502, and power supply 501 are sequentially connected in series. On the other hand, between node N1 and negative-side DC output terminal 122, power supply 601, reactance 602, and negative-side power converter 603 are sequentially connected in series.

Here, when nodes N1 and N2 are taken as virtual neutral points, and AC current I is taken, equations (1) and (2) hold:

$$Vu-j \cdot Xu \cdot I + \text{Varmup} = Vdc/2 \quad (1)$$

$$-Vu+j \cdot Xu \cdot I + \text{Varmun} = Vdc/2 \quad (2)$$

where j represents an imaginary number.

When these equations are modified, equations (1a) and (2a) hold:

$$\text{Varmup} = Vdc/2 - Vu + j \cdot Xu \cdot I \quad (1a)$$

$$\text{Varmun} = Vdc/2 + Vu - j \cdot Xu \cdot I \quad (2a)$$

Here, since voltages Vdc, Vu, and resistance Xu are constant values, AC current I can be controlled to a desired value by controlling each of a positive-side arm voltage Varmup and a negative-side arm voltage Varmun to a prescribed value.

AC current I is increased by increasing positive-side arm voltage Varmup and simultaneously, reducing negative-side arm voltage Varmun by the same amount. Conversely, AC current I is reduced by reducing positive-side arm voltage Varmup and simultaneously, increasing negative-side arm voltage Varmun by the same amount.

Figure 6:
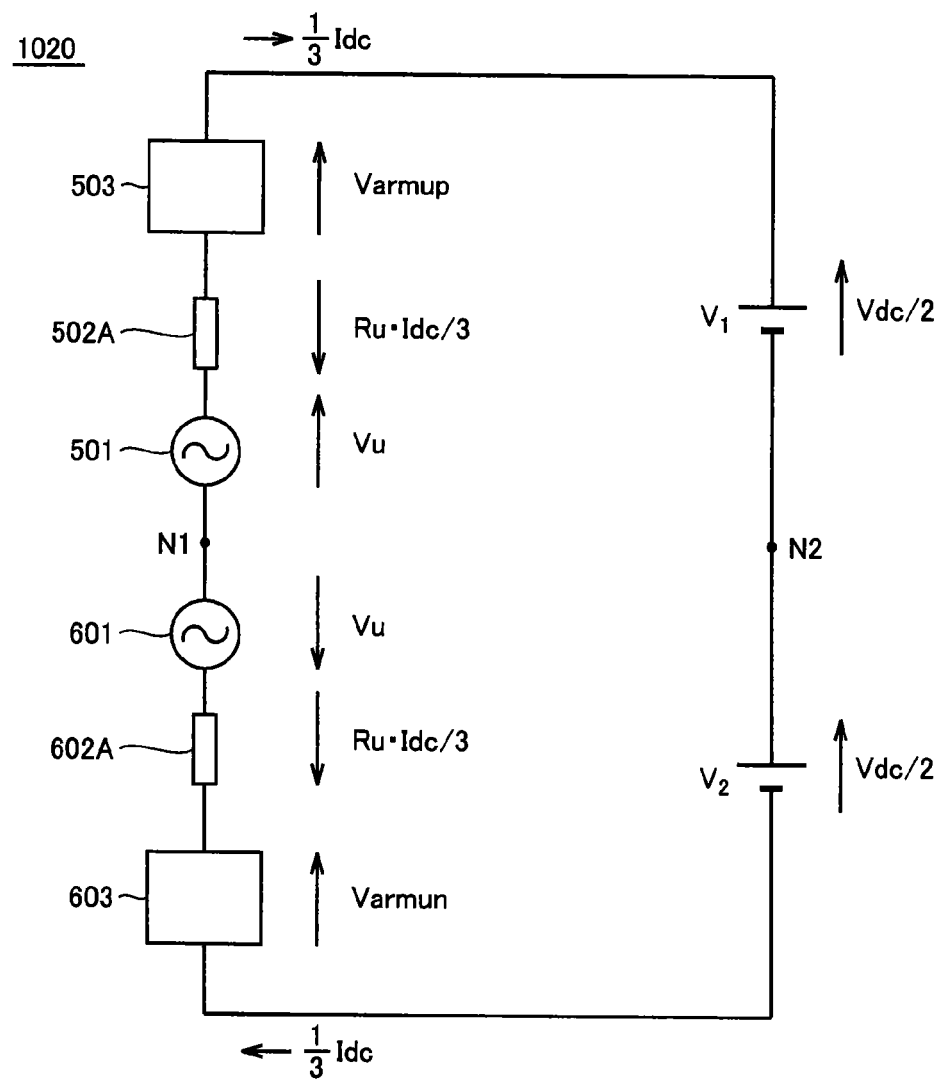
FIG. 6 is a diagram illustrating an equivalent circuit for a DC component of the power conversion apparatus.

Next, FIG. 6 is a diagram illustrating an equivalent circuit for a DC component of the power conversion apparatus. For easy understanding here, an equivalent circuit for a DC component in the u-phase is illustrated and described. With reference to FIG. 6, the structure of an equivalent circuit 1020 includes winding resistances 502A and 602A, instead of winding reactances 502 and 602 of equivalent circuit 1010 illustrated in FIG. 5. Since the structure of equivalent circuit 1020 is otherwise the same as that of equivalent circuit 1010, the description is not repeated herein.

Here, the following equation (3) holds from equivalent circuit 1020:

$$\text{Varmup} + \text{Varmun} - 2Ru \cdot Idc/3 = Vdc \quad (3)$$

As is clear from equation (3), the u-phase voltage (transformer no-load secondary voltage) Vu is canceled and thus, does not appear in equation (3). Furthermore, when equation (3) is modified, the following equation (3a) holds:

$$\text{Varmup} + \text{Varmun} = 2Ru \cdot Idc/3 + Vdc \quad (3a)$$

Here, since DC voltage Vdc and winding resistance Ru are constant values, DC current Idc can be controlled to a desired value by controlling a sum of positive-side arm voltage Varmup and negative-side arm voltage Varmun to a prescribed value.

Increasing arm voltages Varmup and Varmun will increase DC current Idc, and reducing arm voltages Varmup and Varmun will reduce DC current Idc.

While the operation of power conversion with respect to the u-phase has been described with FIGS. 5 and 6, the same structure and operation apply also to the v- and w-phases, and thus, the description is not repeated herein.

Figure 7:
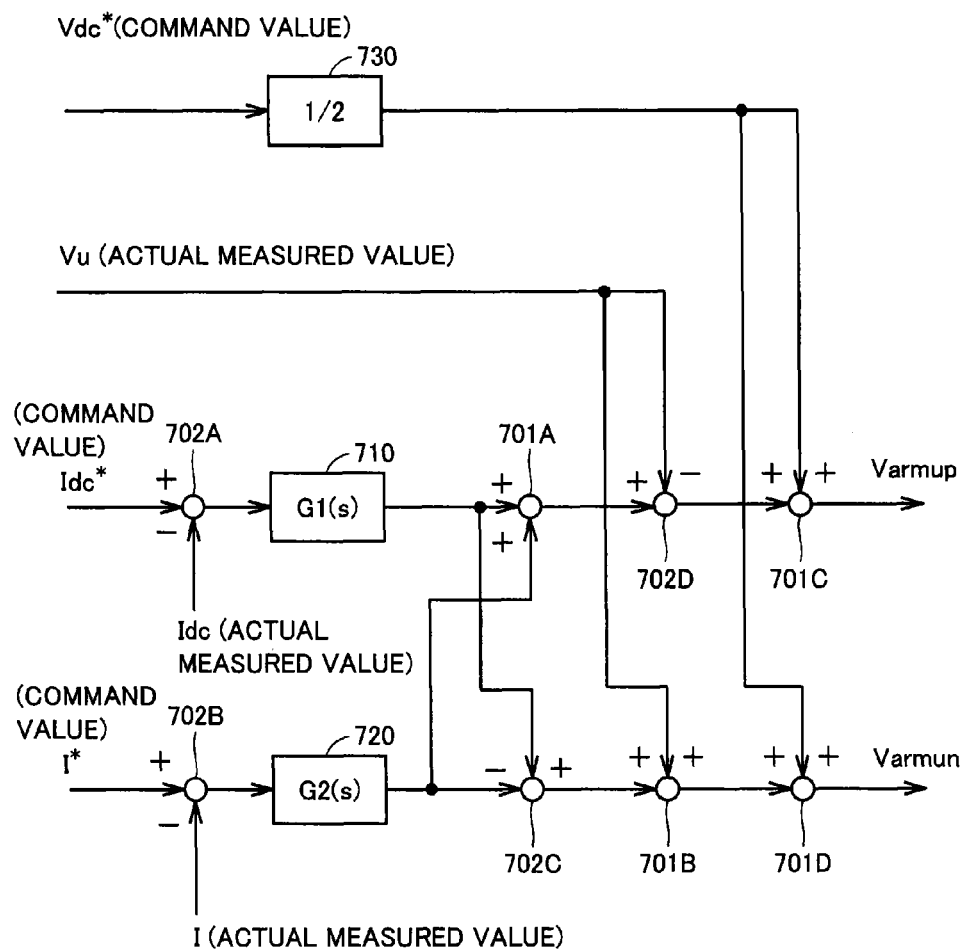
FIG. 7 is a diagram illustrating a principal structure of a control circuit 500 controlling arm voltages Varmup, Varmun.

Next, FIG. 7 is a diagram illustrating a principal structure of control circuit 500 controlling arm voltages Varmup, Varmun. For easy understanding here, the case of the u-phase will be described. With reference to FIG. 7, control circuit 500 includes adders 701A to 701D, subtractors 702A to 702D, a DC current controller 710, an AC current controller 720, and an amplifier 730.

First, subtractor 702A supplies a DC current value (Idc*−Idc) obtained by subtracting DC current (detected value) Idc from DC current command value Idc* to DC current controller 710 (amplification factor g1).

On the other hand, subtractor 702B supplies an AC current value (I*−I) obtained by subtracting AC current (detected value) I from AC current command value I* to AC current controller 720 (amplification factor g2).

Adder 701A adds a DC current amplified by DC current controller 710 (g1×(Idc*−Idc)) and an AC current amplified by AC current controller 720 (g2×(I*−I)).

On the other hand, subtractor 702C subtracts an AC current amplified by AC current controller 720 (g2×(I*−I)) from a DC current amplified by DC current controller 710 (g1×(Idc*−Idc)).

That is, an output current of adder 701A is (g1×(Idc*−Idc)+g2×(I*−I))/2, and an output current of subtractor 702C is (g1×(Idc*−Idc)−g2×(I*−I))/2.

Next, subtractor 702D subtracts a transformer secondary voltage detection value from the current output from adder 701A. On the other hand, adder 701B adds the current output from subtractor 702C and a transformer secondary voltage detection value.

That is, the output current of subtractor 702D is (g1×(Idc*−Idc)+g2×(I*−I))/2−Vu, while the output current of adder 701B is (g1×(Idc*−Idc)−g2×(I*−I))/2+Vu.

Next, adder 701C adds the current output from subtractor 702D and an output voltage obtained by amplifying DC voltage command value Vdc* by amplifier 730 (amplification factor ½), and outputs positive-side arm voltage Varmup as a positive-side arm voltage command value. On the other hand, adder 701D adds the current output from adder 701B and an output voltage obtained by amplifying DC voltage command value Vdc* by amplifier 730 (amplification factor 1/2), and outputs negative-side arm voltage Varmun as a negative-side arm voltage command value.

That is, positive-side arm voltage Varmup as the positive-side arm voltage command value is (g1×(Idc*−Idc)+g2×(I*−I))/2−Vu+Vdc*/2, while negative-side arm voltage Varmun as the negative-side arm voltage command value is (g1×(Idc*−Idc)−g2×(I*−I))/2+Vu+Vdc*/2.

Hence, the DC current and the AC current can be adjusted by setting the arm voltages.

It is noted that in each of the v- and w-phases also, the DC current and the AC current can be adjusted by performing the same operation, and thus, the description is not repeated herein.

Figure 8:
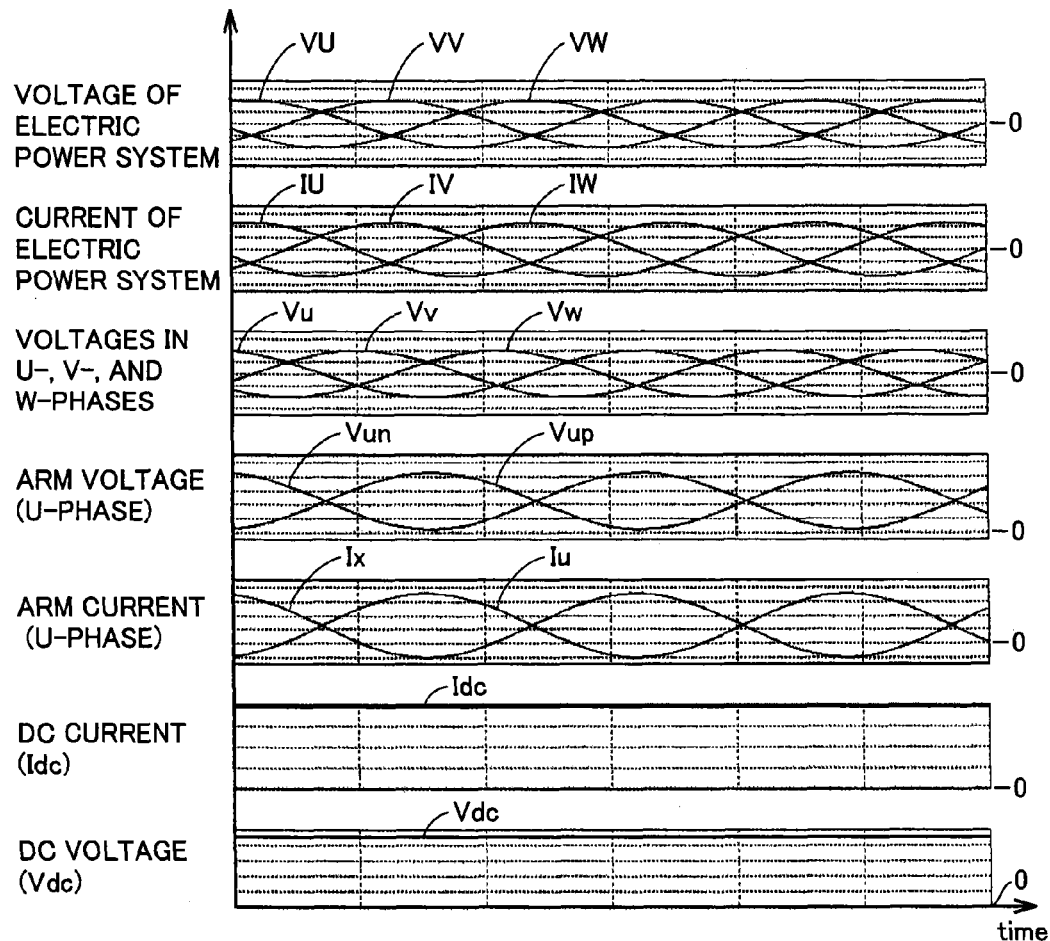
FIG. 8 is a diagram for explaining power conversion operation performed by the power conversion apparatus.

Next, FIG. 8 is a diagram for explaining power conversion operation performed by the power conversion apparatus. With reference to FIG. 8, there are examples of operating waveforms of the power conversion apparatus, illustrating schematic waveforms of voltages VU, VV, and VW and phase currents IU, IV, and IW of three-phase power system 100, secondary voltages Vu, Vv, and Vw of the respective phases, arm voltages Vup and Vun, and arm currents Iu and Ix in the u-phase, DC current Idc, and DC voltage Vdc.

The power conversion apparatus illustrated in FIG. 1 receives effective power from the system at power factor 1, applies DC voltage (Vdc) to load apparatus 123, and passes DC current (Idc). DC voltage Vdc and DC current Idc are set to constant values.

The amplitudes of voltages VU, VV, and VW of the electric power system are substantially equal to one another. Moreover, voltages VU, VV, and VW of the electric power system have a phase difference of 120 degrees from one another.

The amplitudes of phase currents IU, IV, and IW at this time are also substantially equal to one another. Moreover, currents VU, VV, and VW have a phase difference of 120 degrees from one another.

On the other hand, the amplitudes of secondary voltages Vu, Vv, and Vw of the respective phases at this time are substantially equal to one another. Moreover, voltages Vu, Vv, and Vw of the respective phases have a phase difference of 120 degrees from one another. Moreover, voltage VU of the electric power system and secondary voltage Vu in the u-phase have a phase difference of approximately 30 degrees from each other. Similarly, the relations between the other voltages VV and VW and secondary voltages Vv and Vw, respectively, are also substantially the same as above.

Next, with respect to the arm voltages in the u-phase, arm voltage Vup of positive-side converter arm 113 has a DC component substantially equal to Vdc/2, and an AC component having a phase difference of approximately 180 degrees from secondary voltage Vu in the u-phase. On the other hand, voltage Vun of negative-side converter arm 117 has a DC component substantially equal to Vdc/2, and an AC component having a phase difference of approximately 180 degrees from secondary voltage Vu in the u-phase.

Correspondingly, arm current Iu passing through positive-side converter arm 113 has an AC component having a phase difference of approximately 180 degrees from secondary voltage Vu, and a DC component substantially equal to Idc/3.

On the other hand, arm current Ix passing through negative-side converter arm 117 has an AC component substantially equal in phase to secondary voltage Vu, and a DC component substantially equal to Idc/3. Moreover, the amplitudes of arm current Iu and arm current Ix are substantially equal.

Although only the u-phase has been described for easy understanding here, the same also applies to the v- and w-phases, and thus, the description is not repeated herein.

[Example For Consideration]

Figure 9:
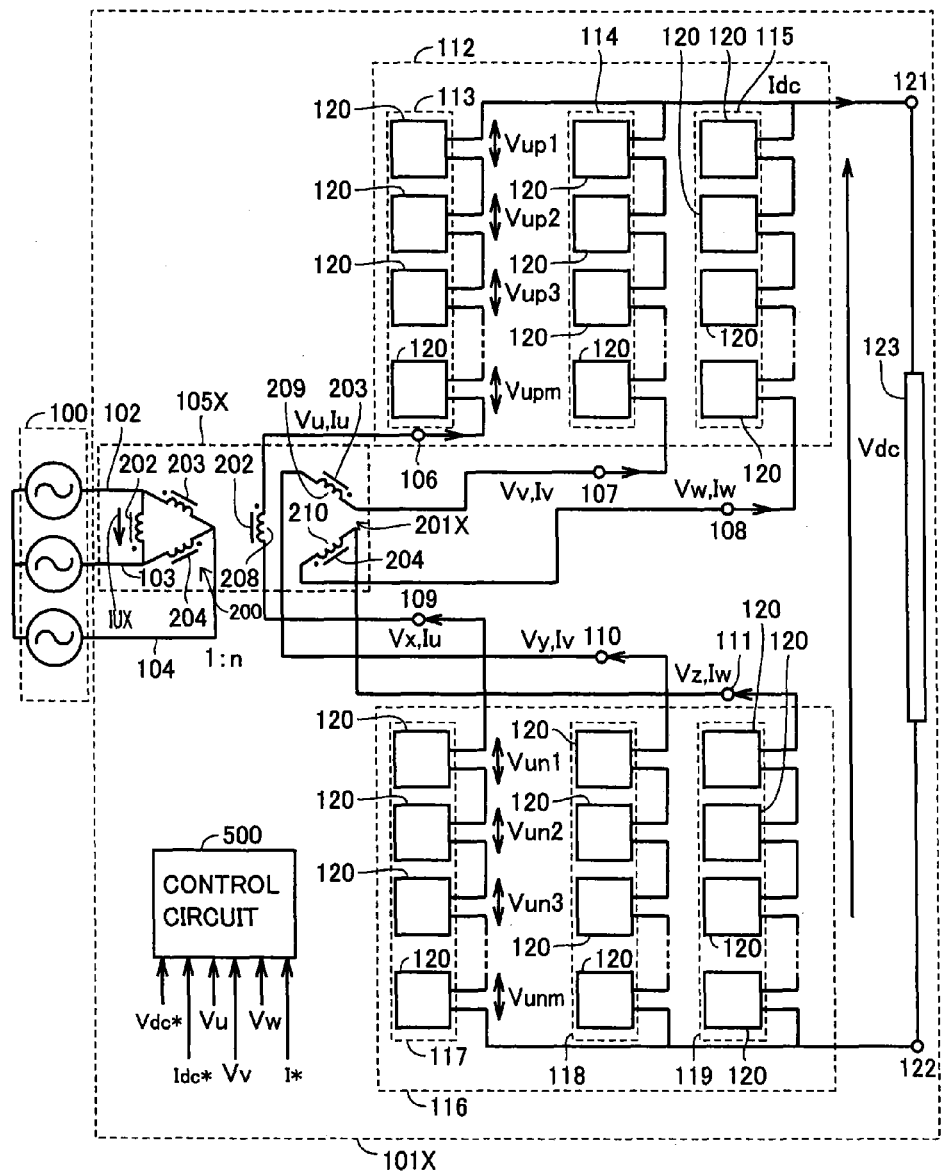
FIG. 9 is a diagram illustrating the structure of a power conversion apparatus in an example for consideration.

FIG. 9 is a diagram illustrating the structure of a power conversion apparatus in an example for consideration.

With reference to FIG. 9, the power conversion apparatus in the example for consideration will be described, for comparison with the power conversion apparatus according to the embodiment. The structure of the power conversion apparatus in the example for consideration includes a secondary winding group 201X, instead of secondary winding groups 201A and 201B in the structure of the power conversion apparatus according to the present embodiment. Since the structure of the power conversion apparatus in the example for consideration is otherwise the same as that of the power conversion apparatus according to the present embodiment, the description is not repeated herein.

The power conversion apparatus in the example for consideration includes single secondary winding group 201X provided for positive-side converter group 112 and negative-side converter group 116, and supplies and receives electric power to and from load apparatus 123.

Current IUX in the u-phase in primary winding group 200 will now be considered.

When DC current Idc passing between positive-side DC output terminal 121 and negative-side DC output terminal 122 is taken, an AC current peak value (I) of AC current I is taken, and the frequency us is taken as the power supply angular frequency, u-phase current Iu of the secondary windings is expressed as in equation (4):

$$Iu = \tfrac{1}{3} \cdot Idc + I \cdot \sin \overline{\omega} t \qquad (4)$$

where the first term in the right side of equation (4) represents the DC component of current Iu, and the second term in the right side of equation (4) represents the AC component of current Iu. Here, since a turns ratio between the primary windings of primary winding group 200 and the corresponding secondary windings in secondary winding group 201X is 1:n, and the current transferred is an AC current only, current IUX in the u-phase of primary winding group 200 is expressed as in the following equation:

$$IUX = n \cdot Iu = n \cdot I \cdot \sin \overline{\omega} t \qquad (5)$$

On the other hand, ⅓·Idc, which is the DC current of current Iu, passes as an exciting current in primary winding group 200. Since a magnetic flux that may be generated due to this current passes through the transformer, it is necessary to increase the cross-sectional area of the iron core of the transformer.

On the other hand, in the power conversion apparatus according to the present embodiment, u-phase current Iu on the positive side of the secondary windings is expressed as in the following equation:

$$Iu = \tfrac{1}{3} \cdot Idc + I \cdot \sin \overline{\omega} t \qquad (6)$$

where, from the above, the first term in the right side represents the DC component, and the second term in the right side represents the AC component.

Next, u-phase current Ix on the negative side of the secondary windings is expressed as in the following equation:

$$Ix = \tfrac{1}{3} \cdot Idc - I \cdot \sin \overline{\omega} t \qquad (7)$$

where the first term in the right side of equation (7) represents the DC component, and the second term in the right side of equation (7) represents the AC component.

Here, since a turns ratio of the primary windings of primary winding group 200, the corresponding secondary windings in secondary winding group 201A, and the corresponding secondary windings in secondary winding group 201B is 1:n/2:n/2, and the current transferred is an AC current only, current IUX in the u-phase of primary winding group 200 is expressed as in the following equation:

$$IUX = n/2 \cdot (Iu - Ix) = n \cdot I \cdot \sin \overline{\omega} t \qquad (8)$$

Here, the exciting current of the DC component, which is problematic in the power conversion apparatus in the example for consideration, does not pass in the power conversion apparatus according to the present embodiment, because the DC component of a magnetomotive force is canceled in the two secondary windings wound around the same iron core. It is thus unnecessary to increase the cross-sectional area of the iron core of the transformer, which allows the mounting area and costs to be reduced.

Therefore, since the power conversion apparatus according to the present embodiment illustrated in FIG. 1 adopts the structure in which secondary winding groups 201A and 201B are provided on the positive-side converter group 112-side and the negative-side converter group 116-side, respectively, instead of adopting the structure having a single secondary winding, as in the power conversion apparatus in the example for consideration, the DC component of the magnetomotive force can be canceled, and thus, it is unnecessary to increase the cross-sectional area of the iron core of the transformer, allowing a reduction of costs.

Lastly, the present embodiment will be summarized with reference to FIG. 1 and the like again.

As illustrated in FIGS. 1 and 2, the power conversion apparatus according to the present embodiment includes three-phase transformer 105 interconnected to three-phase power system 100, wherein three-phase transformer 105 includes primary winding group 200 that receives three-phase electric power of the three-phase electric power system, secondary winding group 201A and secondary winding group 201B that receive electric power transferred from the primary winding group, and converter group 112 and converter group 116 connected to secondary winding groups 201A and 201B, respectively, primary winding group 200 has primary windings 205 to 207, secondary winding group 201A has secondary windings 208A to 210A having respective one ends star-connected at a neutral point, secondary winding group 201B has secondary windings 208B to 210B having respective one ends star-connected at a neutral point, the respective neutral points of secondary winding groups 201A and 201B are connected to each other, converter group 112 has converter arms 113 to 115 having respective one ends connected to other ends of secondary windings 208A to 210A, converter group 116 has converter arms 117 to 119 having respective one ends connected to other ends of secondary windings 208B to 210B, and the power conversion apparatus further includes a DC output terminal group (121, 122) connected to at least one of other ends of converter arms 113 to 115, and connected to at least one of other ends of converter arms 117 to 119.

Preferably, as illustrated in FIG. 1, DC output terminal group 121, 122 includes positive-side DC output terminal 121 and negative-side DC output terminal 122, the other ends of converter arms 113 to 115 are all connected to positive-side DC output terminal 121, and the other ends of converter arms 117 to 119 are all connected to negative-side DC output terminal 122.

Preferably, as illustrated in FIG. 1, electric power is supplied to load apparatus 123 connected to the DC output terminal group (121, 122), the power conversion apparatus further includes control circuit 500 for supplying and receiving electric power to and from the load apparatus, and control circuit 500 controls voltage applied to the DC output terminal group (121, 122) by adjusting voltages of converter arms 113 to 115 and 117 to 119.

Preferably, as illustrated in FIG. 1, each of converter arms 113 to 115 and 117 to 119 has a plurality of unit converters 120 cascade-connected.

More preferably, as illustrated in FIGS. 3 and 4, unit converter 120 includes a full bridge circuit or a bidirectional chopper circuit.

More preferably, as illustrated in FIGS. 3 and 4, unit converter 120 has DC capacitor 306 or 405 for smoothing an output of the full bridge circuit or the bidirectional chopper circuit.

The embodiments disclosed here should be understood as being illustrative rather than being limitative in all respects. For example, the primary windings of transformer 105 may be delta-connected or star-connected, and may also be replaced with three single-phase transformers. The scope of the present invention is shown not in the foregoing description but in the claims, and it is intended that all modifications that come within the meaning and range of equivalence to the claims are embraced here.

Reference Signs List

100: three-phase electric power system; 101, 101X: power conversion apparatus; 105, 105X: transformer; 106 to 108: positive-side terminal; 109 to 111: negative-side terminal; 112: positive-side converter group; 113 to 115: positive-side converter arm; 116: negative-side converter group; 117 to 119: negative-side converter arm; 120: unit converter; 121: positive-side DC output terminal; 122: negative-side DC output terminal; N1, N2: node; 123: load apparatus; 200: primary winding group; 201A, 201B, 201X: secondary winding group; 202 to 204: iron core; 205 to 207: primary winding; 208A to 210A, 208B to 210B: secondary winding; 302 to 305, 403 to 404: switching element; 306, 405: energy storage element; 500: control circuit; 501, 601, V1, V2: power supply; 502, 602: winding reactance; 502A, 602A: winding resistance; 503: positive-side power converter; 603: negative-side power converter; 701A to 701D: adder; 702A to 702D: subtractor; 710: DC current controller; 720: AC current controller; 730: amplifier.

The invention claimed is:

1. A power conversion apparatus comprising:
a three-phase transformer interconnected to a three-phase power system;
said three-phase transformer including:
a primary winding group that receives three-phase AC electric power of said three-phase electric power system;
a first secondary winding group and a second secondary winding group that receive the three-phase AC electric power transferred from said primary winding group;
first to third iron cores; and
a first converter group and a second converter group provided for said first and second secondary winding groups, respectively,
said primary winding group having first to third primary windings,
said first secondary winding group having a first neutral point, and having first to third secondary windings having respective one ends star-connected at said first neutral point,
said second secondary winding group having a second neutral point, and having fourth to sixth secondary windings having respective one ends star-connected at said second neutral point,
said first neutral point of said first secondary winding group and said second neutral point of said second secondary winding group being connected to each other,
said first primary winding, said first secondary winding, and said fourth secondary winding being wound around said first iron core,
said second primary winding, said second secondary winding, and said fifth secondary winding being wound around said second iron core,
said third primary winding, said third secondary winding, and said sixth secondary winding being wound around said third iron core,
said first converter group having first to third converter arms having respective one ends connected to other ends of said first to third secondary windings,
said second converter group having fourth to sixth converter arms having respective one ends connected to other ends of said fourth to sixth secondary windings,
said three-phase transformer further including
a positive-side DC output terminal connected with other ends of said first to third converter arms;
a negative-side DC output terminal connected with other ends of said fourth to sixth converter arms; and
a control circuit controlling a DC voltage applied between said positive-side DC output terminal and said negative-side DC output terminal by adjusting a voltage of each of said first to sixth converter arms.

2. The power conversion apparatus according to claim 1, wherein
   each of said first to sixth converter arms has a plurality of unit converters cascade-connected.

3. The power conversion apparatus according to claim 2, wherein
   each of said unit converters includes a full bridge circuit or a bidirectional chopper circuit.

4. The power conversion apparatus according to claim 3, wherein
   each of said unit converters has a DC capacitor for smoothing an output of said full bridge circuit or said bidirectional chopper circuit.

\* \* \* \* \*